Figure 1:
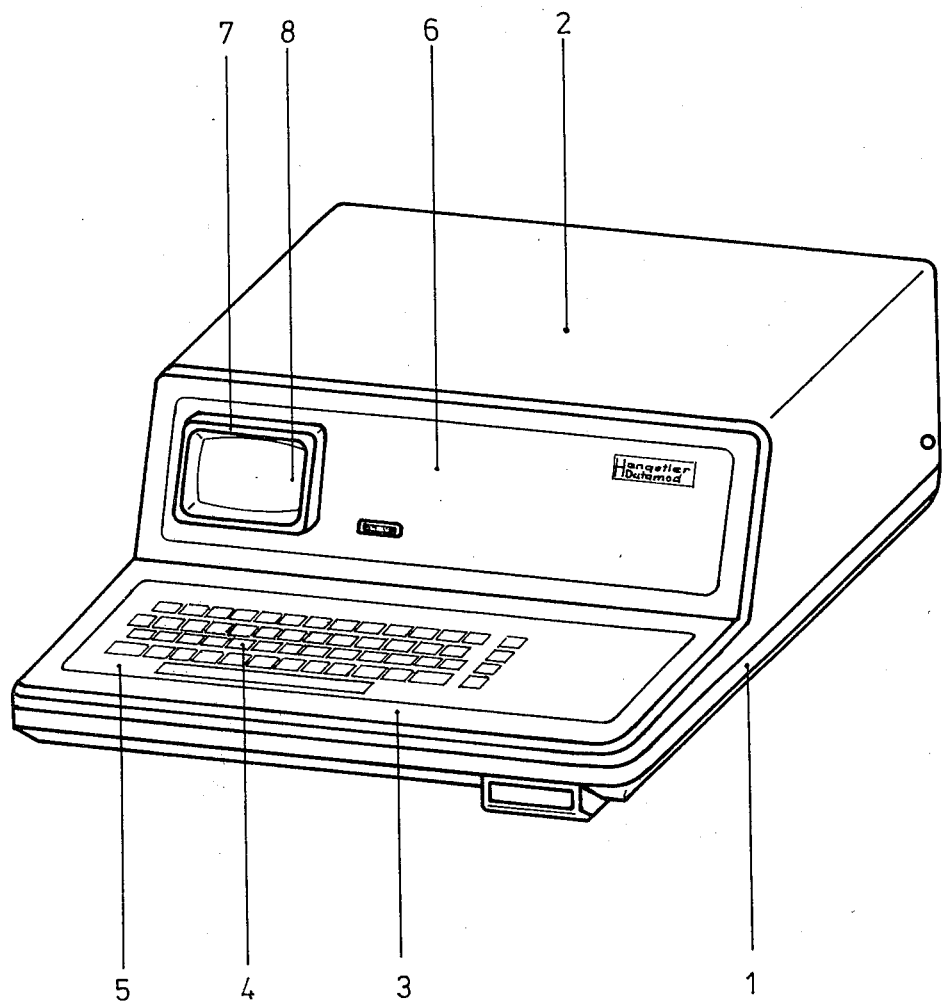

United States Patent [19]

Blepp

[11] 4,425,014
[45] Jan. 10, 1984

[54] HOUSING FOR DATA ENTRY EQUIPMENT

[75] Inventor: Martin Blepp, Weilen, Fed. Rep. of Germany

[73] Assignee: J. Hengstler K.G., Aldingen Kr. Tuttlingen, Fed. Rep. of Germany

[21] Appl. No.: 285,423

[22] Filed: Jul. 20, 1981

[30] Foreign Application Priority Data

Jul. 31, 1980 [DE] Fed. Rep. of Germany ... 8020621[U]

[51] Int. Cl.³ .............................................. A47B 95/00
[52] U.S. Cl. .................................... 312/284; 312/251; 312/302; 312/324
[58] Field of Search ............... 312/194, 196, 208, 242, 312/251, 223, 284, 298, 302, 274, 324, DIG. 33; 292/DIG. 37, 87; 400/693; 235/145, 146

[56] References Cited

U.S. PATENT DOCUMENTS 2,670,981 3/1959 Wenham ..................... 292/DIG. 37
3,199,936 10/1965 Kuhlmann ..................... 312/284 X
3,419,123 12/1968 Salzberger et al. ............. 400/693 X
3,778,125 12/1973 Gutmann, Jr. et al. ........ 312/223 X Primary Examiner—William E. Lyddane
Assistant Examiner—Joseph Falk
Attorney, Agent, or Firm—Balogh, Osann, Kramer, Dvorak, Genova & Traub

[57] ABSTRACT

The housing is intended for use with data entry equipment having first manual control elements for routine operation and second manual control elements not required for routine operation and comprises a baseplate and a cover device covering the baseplate while leaving the first manual control elements exposed. The cover device comprises a first covering element, which is adapted to be opened to expose the entire interior of the housing, and a second covering element, which normally covers the second manual control elements and is adapted to be opened independently of the first covering element to expose the second manual control elements.

15 Claims, 4 Drawing Figures

HOUSING FOR DATA ENTRY EQUIPMENT

This invention relates to a housing for data entry equipment comprising manual control means, which housing comprises a baseplate under said manual control means and covering means covering said baseplate while leaving said manual control means exposed.

It is known to provide data entry equipment having manual control means and a fluorescent screen with a cover which is secured by means of screws to a baseplate and can be entirely removed. For access to the data entry equipment disposed under the cover, the bulky cover must be removed. The release and fixation of said cover is difficult so that the equipment can be rendered accessible for servicing only by complicated operations. Besides, the provision of manually operable keys which are always visible although they are not required for the routine operation of the equipment will divert the attention of the operator, and additional means are required to prevent an unauthorized operation of such keys.

It is an object of the invention to eliminate these disadvantages and to provide a keyboard for routine operation and additional control means which are operated less frequently and can be rendered accessible without a removal of the entire cover.

For this purpose the housing for data entry equipment comprising manual control means, which housing comprises a baseplate under said manual control means and covering means covering said baseplate comprises covering means including first and second covering elements, the first of which is adapted to be swung open to entire interior of the housing for the servicing of said equipment whereas the second covering element is adapted to be swung open to expose manual control means which are required to be operated only from time to time. The second covering element may be hinged to the first so that the second covering element can be swung up alone and the first covering element can be swung up together with the second.

Each of the first and second covering elements is hinged and the first and second covering elements together with the baseplate constitute a compact housing, which can be electrically connected to the equipment contained therein by flexible leads without plugs. Besides, the second covering element may be used to prevent an unauthorized operation of certain manual control elements so that the manual control means for routine operation can be more clearly arranged and can be operated more conveniently. The instruction manual can be accommodated in a drawer so that it is always at hand.

Figure 2:
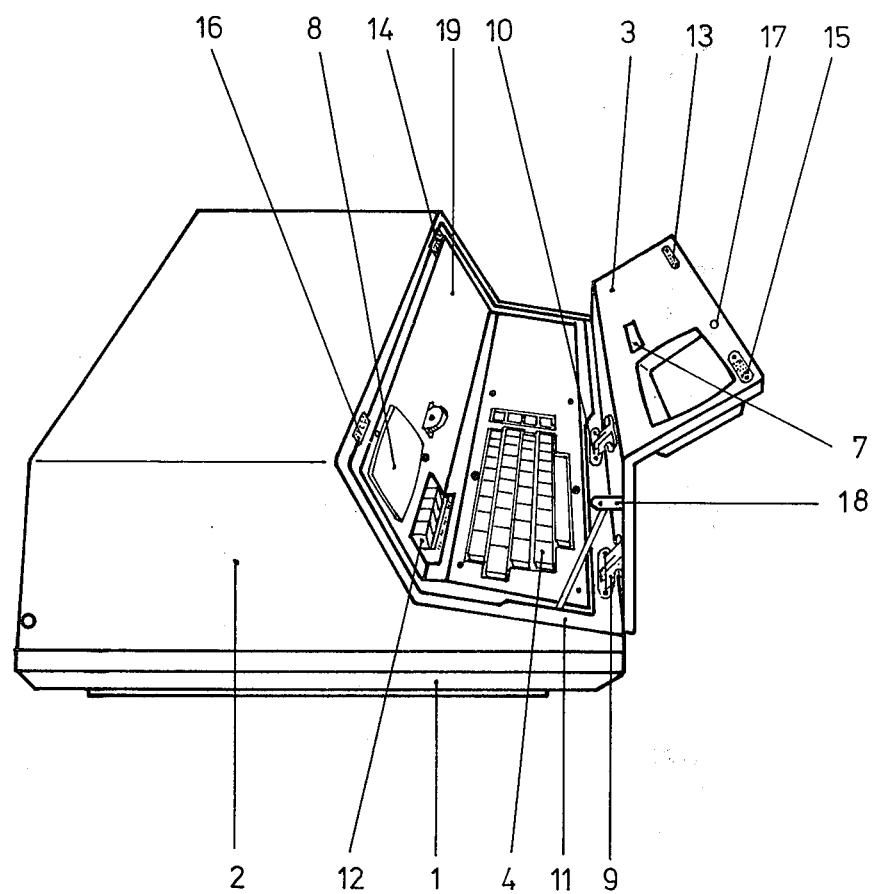
Figure 3:
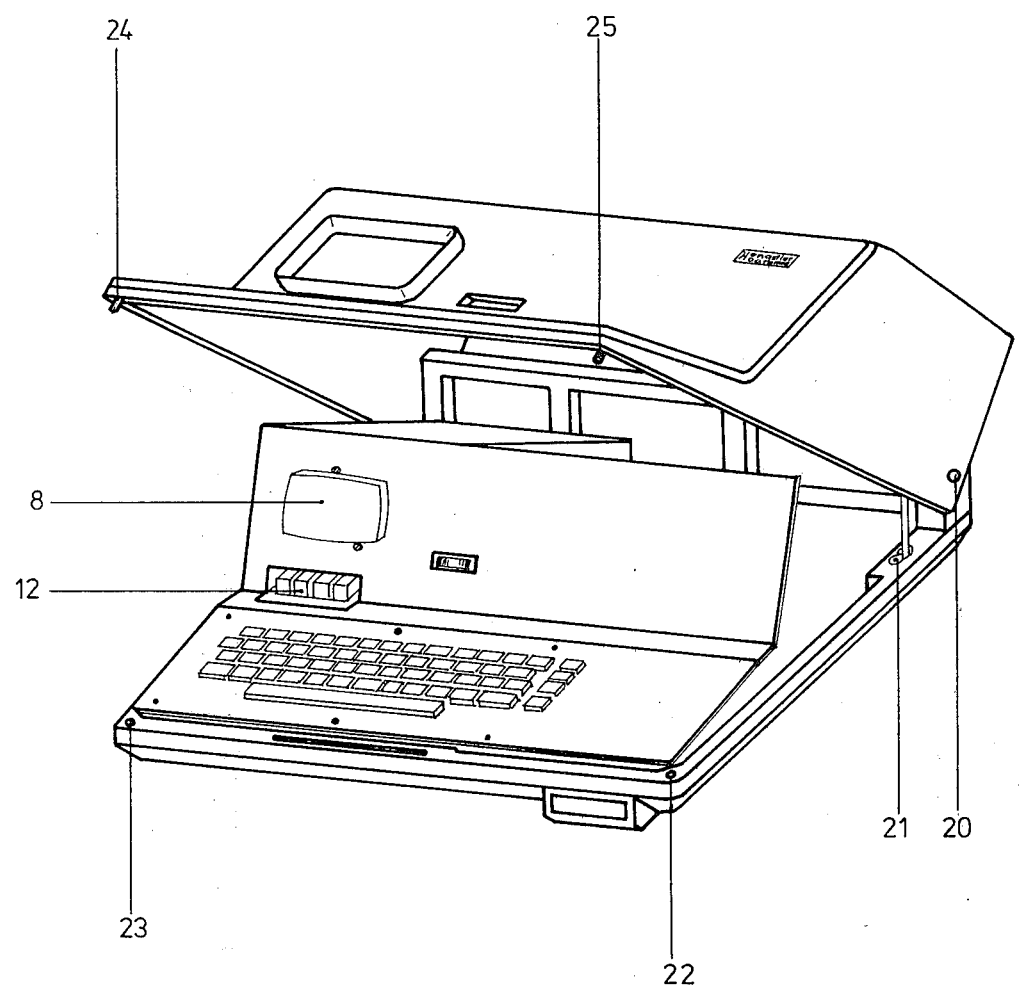
Figure 4:
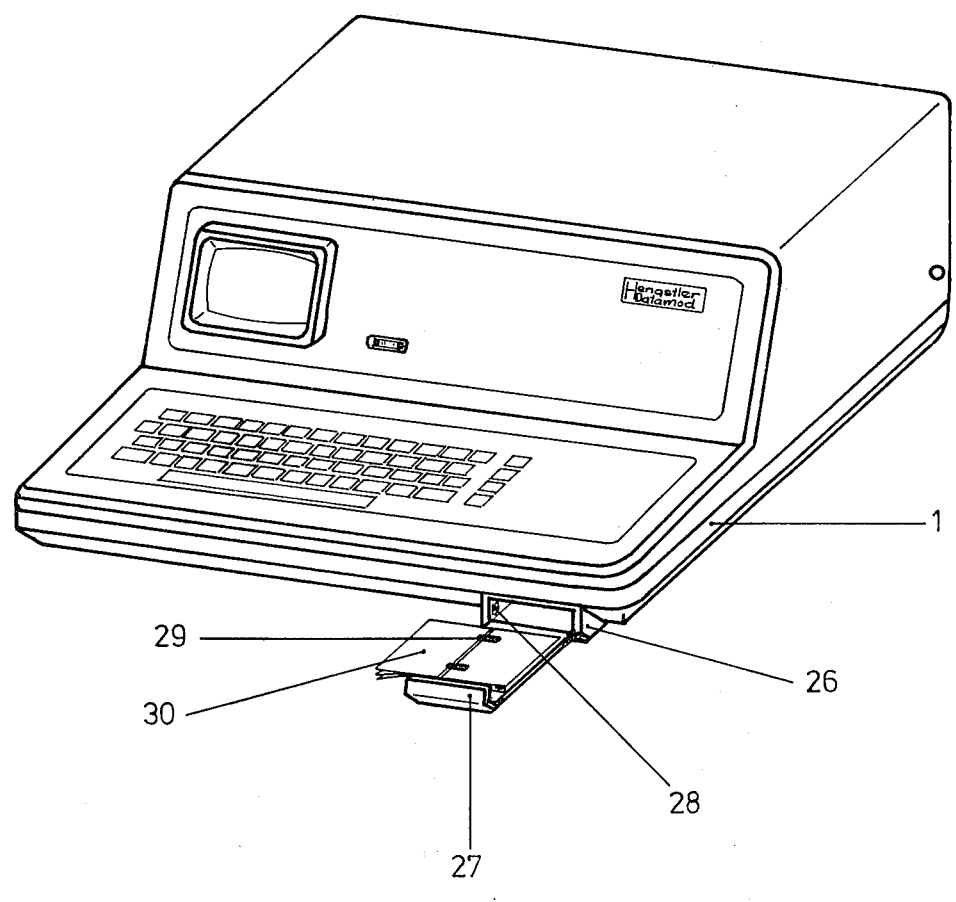

A preferred embodiment of the invention is shown by way of example on the drawing, in which FIG. 1 is a perspective view showing the housing in a closed position, FIG. 2 is a perspective view showing the housing of FIG. 1 with the second covering element opened, FIG. 3 is a perspective view showing the housing of FIG. 1 with the first and second covering elements opened, and FIG. 4 is a perspective view showing the housing of FIG. 1 with the pulled out drawer containing the instruction manual.

A housing for data entry equipment is shown in FIG. 1 and comprises a baseplate 1, a first covering element 2 and a second covering element 3 in a closed position. The contour of the first covering element 2 in a top plan view is coextensive with the contour of the baseplate 1. The second covering element 3 covers only the recess 5, which contains a keyboard 4, and the display panel 6 having a recess 7 which accommodates a fluorescent screen 8.

As is apparent from FIG. 2, the second covering element 3 is connected to a frame 11 of the first covering element 2 by hinges 9 and 10 and can be swung open to render function keys 12 accessible, which should be operated only by a releasably held in position by detent elements 13, 14, 15 and 16 and is fixed by the key-operable lock 17. The linkage 18 connected to the second covering element 3 cooperates with a stop of the frame 11 to limit the opening movement of the second covering element 3 so that connecting lines between the equipment contained in the housing and the second covering element 3 will not be damaged by an excessive opening of the second covering element 3. That portion of the interior of the housing which is disposed under the second covering element 3 is separated from the remainder of said interior by a partition 19.

FIG. 3 shows the first covering element 2 as it is turned open about the pivotal axis 20. The opening movement of the first covering element 2 is limited by the linkage 21, which is connected to the first covering element 2 and cooperates with a stop of the baseplate 1. The first covering element 2 is held in its closed position by screws 24, 25, which have been screwed into tapped bores 22, 23 and can be turned only by means of a special tool and only when the second covering element 3 is open. The screws 24, 25 will not be accessible when the second covering element 3 has been fixed by the lock 17. The first covering element 2 must be opened only when the equipment is to be serviced, i.e., when circuit-carrying modules are to be repaired or replaced. These modules and circuits are accessible when the first covering element 2 has been opened.

FIG. 4 shows a drawer 27, which is accommodated in a drawer holder 26 that is integral with the baseplate 1. The drawer 27 can be released by the operation of the pushbutton 28 and accommodates the instruction manual 30, which is captively held by binder rings 29.

What is claimed is:

1. In a housing for data entry equipment having first manual control means for routine operation and second manual control means, not required for routine operation, which housing comprises a baseplate and covering means covering said baseplate while leaving said first manual control means exposed, the improvement residing in that said covering means comprise a first covering element, which is adapted to be opened to admit maintenance access to the entire interior of said housing, and a second covering element pivotally coupled to said first covering element, said second covering element normally covering said second manual control means and being adapted to be opened independently of said first covering element to admit maintenance access to said second manual control means.

2. The improvement set forth in claim 1, wherein said first covering element is connected to said baseplate and movable to an open position relative to said baseplate and said second covering element is connected to said first covering element and movable to an open position relative to said first covering element.

3. The improvement set forth in claim 2, wherein said first covering element is connected to said base-plate by hinge means and is adapted to be swung open about said hinge means.

4. The improvement set forth in claim 2, wherein said second covering element is connected to said first covering element by hinge means and is adapted to be swung open about said hinge means.

5. The improvement set forth in claim 2, wherein said first covering element is secured to said baseplate by fastening means which can be released only by a special tool.

6. The improvement set forth in claim 2, wherein said fastening means comprise screws.

7. The improvement set forth in claim 2, which comprises
linkage means pivoted to one of the parts consisting of the baseplate and said first covering means and
stop means carried by the other of said parts and engageable by said linkage means to limit the opening movement of said first covering element relative to said baseplate.

8. The improvement set forth in claim 2, which comprises detent means releasably holding said second covering element in a closed position relative to said first covering element.

9. The improvement set forth in claim 2, which comprises a key-operable lock preventing a movement of said second covering element to an open position relative to said first covering element.

10. The improvement set forth in claim 9, wherein
said first covering element is secured to said baseplate by fastening means and
said second covering element normally covers said fastening means and is adapted to be opened to expose them.

11. The improvement set forth in claim 2, which comprises
linkage means pivoted to one of said first and second covering elements and
stop means carried by the other of said covering elements and engageable by said linkage means to limit the opening movement of said second covering element relative to said first covering element.

12. The improvement set forth in claim 2, wherein
said second covering element is apertured to expose said first manual control means,
said first covering element is connected to said baseplate by first hinge means and is adapted to be swung open about said first hinge means in a first sense and
said second covering element is connected to said first covering element by second hinge means on an axis that is parallel to that of said first hinge means and said second covering element is adapted to be swung open about said second hinge means in a second sense, which is opposite to said first sense.

13. The improvement set forth in claim 1 as applied to housing for equipment having an internal partition, wherein
said covering element and said baseplate are adapted to define a compartment with said partition,
said covering element is adapted to be opened to render the interior of said compartment accessible, and
said second covering element normally covers said partition and is adapted to be opened to expose said partition.

14. The improvement set forth in claim 1, including a drawer holder integrally associated with said baseplate, a drawer slidably supported in said drawer holder, said drawer accommodating an instruction manual which is provided below said first manual control means,
detent means are provided for releasably holding said drawer in a closed position, and
a pushbutton is provided, which is operable to release said detent means.

15. The improvement set forth in claim 14, wherein
said drawer has a bottom and
binder rings for captively holding said instruction manual are mounted on said bottom.

* * * * *